Nov. 23, 1965  D. E. WEHNER  3,218,991
RUBBER TIRED VEHICLE WHEEL GUIDE
Filed May 2, 1963  2 Sheets-Sheet 1

INVENTOR
David E. Wehner
Green, McCallister &
Miller
HIS ATTORNEYS

Nov. 23, 1965  D. E. WEHNER  3,218,991
RUBBER TIRED VEHICLE WHEEL GUIDE
Filed May 2, 1963  2 Sheets-Sheet 2

INVENTOR
David E. Wehner
Green, McCallister &
Miller
HIS ATTORNEYS

United States Patent Office 3,218,991
Patented Nov. 23, 1965

3,218,991
RUBBER TIRED VEHICLE WHEEL GUIDE
David E. Wehner, Allison Park, Pa., assignor of fifty percent to Howard S. Auld, Allison Park, Pa.
Filed May 2, 1963, Ser. No. 277,514
2 Claims. (Cl. 105—368)

This invention relates to guiding apparatus for assisting rubber tired vehicles, such as automobiles and trailer trucks, to maneuver along narrow roadways. This invention is especially useful for guiding long commercial trailer trucks as they are backed up for various purposes.

There are many situations where rubber tired vehicles must be guided along narrow paths, such as in approaching downtown loading docks, moving into garages, across narrow bridges, or onto vehicle lifting apparatus, and recently in the case of trailer trucks moving onto and along flat-type railroad cars for "ferry-back" or "piggyback" transportation.

The guiding problem raised by such situations is currently solved by employing a highly skilled operator who must exert considerable effort and time to maneuver the vehicle as required. This solution often results in traffic tie-ups, which everyone has experienced, that occur because traffic must wait for a single truck to maneuver back and forth until it gets in proper position. As new automobiles grow larger and wider, existing home-garage facilities do not, and the simple job of putting one's automobile in the garage becomes a tedious and difficult task, even for experienced drivers and especially for inexperienced drivers. Due to the advent and development of piggy-back railroading, commercial trailers are loaded onto flat railroad cars by backing the trailer carefully up a ramp and onto a row of cars. It is apparent that time-consuming care must be given to this back-up operation since even a slight off-angle could result in the trailer getting out of position, so that it would either fall off the edge of the car or would require the driver to pull forward and reposition the trailer on the cars.

Although many of these maneuvering problems have been in existence for a long period of time, there have been no satisfactory solutions developed, and truckers continue to tie-up downtown traffic, motorists continue to scratch fenders and the transportation industry continues to pay the high cost of time consumed in loading trailers onto flat cars.

Accordingly, it has been an object of my invention to fully investigate the theoretical and practical problems that are encountered in maneuvering various rubber tired vehicles along narrow paths;

Another object of my invention has been to provide a vehicle wheel guide that is both sturdy and foolproof in operation, such that its practical efficiency will more than outweigh its additional expense;

Another important object of my invention has been to provide wheel guide apparatus that is constructed to give a maximum guiding force to the respective vehicle wheel while totally eliminating any possibility of damage to the wheels or tires of the vehicle;

A further object of my invention has been to provide a portable vehicle guide that can be transported with the vehicle, such as a trailer truck, to be used whenever a difficult maneuvering situation is encountered.

These and other objects of my invention will become apparent to those skilled in the art upon reading and understanding the following disclosure of my inventive concepts and some illustrative embodiments thereof.

One phase of my invention involves the use of a supplemental pathway, preferably constructed of smooth steel plate, in combination with at least a pair of curbs having a plurality of axially-serially aligned rollers that substantially continuously engage operatively opposed side walls of vehicle tires as the vehicle passes along the pathway. I have found that by employing a smooth hard supplemental pathway to reduce friction and simultaneously employing sturdy but non-injurious guiding curbs, it is possible to continuously guide a vehicle along a narrow path in a foolproof manner. In a preferred embodiment of my invention I employ additional friction reducing means, such as a water spray. As water is a natural lubricant for rubber and is completely evaporable, it is possible to inexpensively and neatly maximize the guiding efficiency of the wheel guide apparatus.

Another phase of my invention relates to the use of rollers in the aforementioned roller curb, that are of a short length with respect to the diameter of the guided tire and are positioned above the pathway such that a single roller will not simultaneously engage both the leading and trailing side walls of the vehicle wheel. Since the rollers are employed to guide the vehicle wheel without injuring it, as by excessive rubbing or sliding, it is necessary for each of the rollers to move freely in response to an engaging portion of the tire side wall. In some cases where very large diameter tires are employed, it is desirable to provide rollers having a plurality of relatively rotatable sections such that the roller portion engaging the outer periphery of the vehicle wheel can rotate at a greater speed than the roller section engaging a radially inner portion of the vehicle tire. Also, it may be desirable in some instances to make adjustments in the relative height of the pathway with respect to the rollers. This can be accomplished quite simply by building up the pathway using wooden planks as spacers.

A further phase of my invention involves the use of a specially designed portable wheel guide unit having means such as a rubber pad or cleats for increasing the co-efficient of friction between the apparatus and the normal roadway upon which it is laid. Also I have found that by constructing such a portable wheel guide unit so that the weight of the guided vehicle is imposed upon the unit before the wheel comes into guiding engagement with the roller curbs, it is possible to utilize the weight of the vehicle to effectively hold the apparatus in place and thereby cause the vehicle to guide itself.

These phases or general concepts upon which my invention is based will be more fully understood by referring to the following description of some illustrative embodiments thereof wherein specific reference is made to the accompanying drawings of which:

Figure 1:
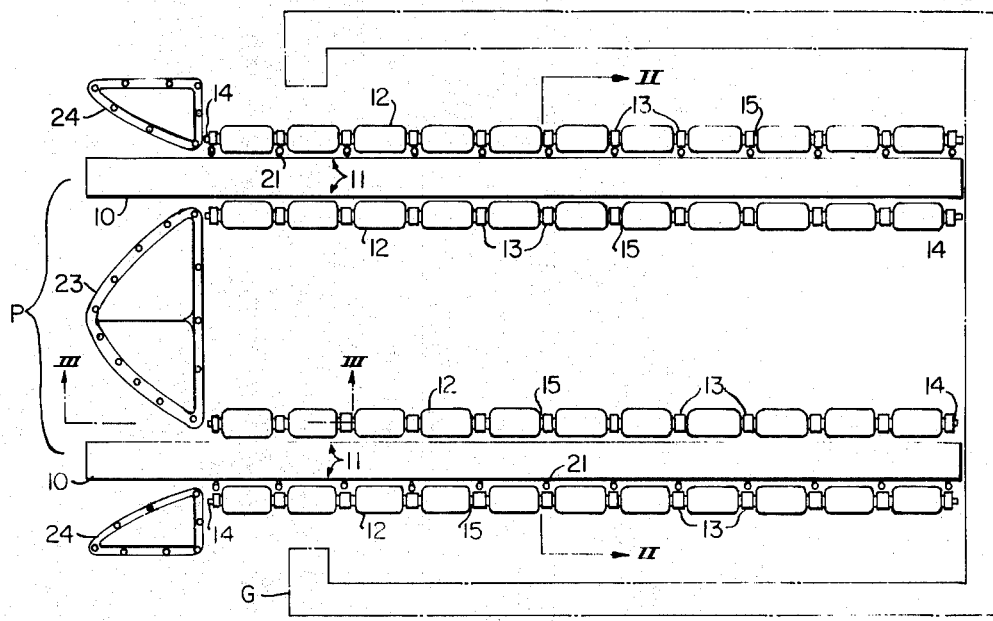
FIGURE 1 is a plan view of a section of one form of my vehicle guide apparatus as applied to a home garage.
Figure 3:
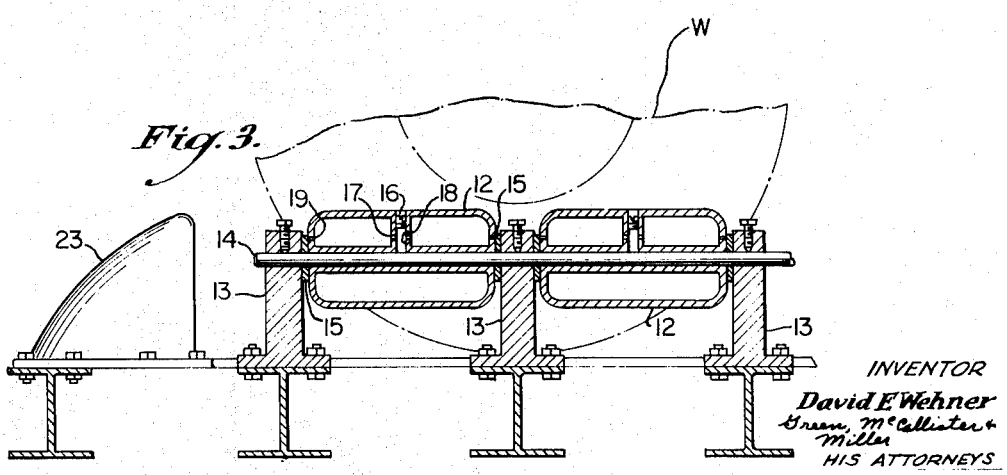
FIGURE 3 is an enlarged side elevational view in cross-section taken along lines III—III of FIGURE 1 showing further details of construction thereof.

In FIGURE 1 there is shown a pathway P that is defined by smooth plate means such as a pair of hard steel plates 10 which are width-wise spaced apart a distance equal to the distance between conventional vehicle wheels. On each side of the plates 10 there is positioned means for substantially continuously engaging the side walls of a tire which, for convenience, will be called a roller curb. Each roller curb 11 is composed of a plurality of axially-serially aligned wheel guide members or rollers that are rounded in axial cross-section and are preferably constructed of steel. Of course, the rollers 12 can be made of any strong, hard material such as metal or an appropriate resin. The rollers 12 are supported for rotative movement about their longitudinal axes by suitable curb support means such as a plurality of interspersed supporting brackets 13 that carry a shaft 14 as more clearly shown in FIGURE 3. The rollers 12 are rotatably supported on the shaft 14 and are isolated from the interspersed support brackets 13 by bronze or other soft material, thrust bearings or washers 15 which are also supported by the shaft 14. As best shown in FIGURE 3, suitable grease fittings 16 are provided in each roller 12 together with lubricating passages 17, 18, and 19, so that the shaft 14 and the thrust bearings 15 are adequately lubricated and will turn freely. The support brackets 13 may be connected to any sufficiently rigid stationary structure, the concrete imbedded "I" sections shown being merely illustrative of one useful support configuration.

As is clearly shown in FIGURE 3 the rollers 12 are somewhat elongated in the direction of their axis of rotation and are rounded about their opposed ends so as to present no sharp edges to an impinging rubber tire. A conventional wheel W is shown for reference purposes to illustrate the relative size of the rollers 12. It will thus be seen that the rollers are relatively short in length with respect to the diameter of a tire and preferably are no longer than about one-third of the diameter of a tire so that a single roller 12 cannot simultaneously engage both the leading and trailing side walls thereof. As also appears in FIGURE 3 the rollers 12 are positioned approximately one-third of the way up along the sides of the guided tire such that they engage a portion of the tire having substantial vertical component of movement without interfering with the hub of the wheel. It will thus be seen that slippage between the roller 12 and the wheel W is minimized to the extent practical. As further appears from FIGURE 3, the interspersed support brackets 13 are sufficiently small so as to be completely concealed from the tire eliminating the possibility of any tire damage through contact with sharp stationary members.

Figure 2:
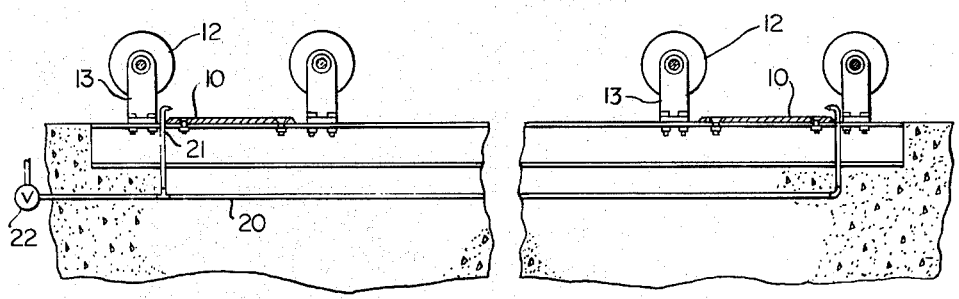
FIGURE 2 is an enlarged front view in cross-section taken along lines II—II of FIGURE 1 showing some of the details of construction thereof.

In FIGURE 2, piping structure 20 is shown including a plurality of nozzles 21 for spraying a suitable lubricant such as water onto the plate 10 just prior to traversal thereof by the vehicle tire. The water spray can be manually controlled by a hand valve 22 if desired or can be automatically controlled in response to the presence, of a vehicle entering upon the pathway P. Of course, various additives such as an antifreeze or a corrosion inhabitor can be added to the water spray by suitable mixing means not shown.

The embodiment shown in FIGURE 1 illustrates how my invention can be employed to assist in parking an automobile in a home garage G. The garage G, as shown in outline in FIGURE 1, is relatively small compared to the size of an automobile as is the case in garages constructed with many of the older homes, in comparison to today's automobile. It will be seen that the guiding apparatus extends outwardly of the garage, and has at its entrance end portion, a set of entrance guide means such as plates or blocks 23 and 24 that can be pressed from sheet steel or cast in concrete if desired. The entrance blocks 23 and 24 provide a funnel-like guiding surface to assist in getting the vehicle tires centrally onto the path P. It will be appreciated that with a guiding device as shown in FIGURE 1, one should have little difficulty in aligning a wide automobile with the relatively narrow opening in the garage. Furthermore, canting of the automobile with respect to the garage either on entrance thereto or exit therefrom is virtually impossible. The design of the rollers 12 and all of the various features mentioned above assure the user that the tires of his vehicle will not be damaged.

Figure 4:
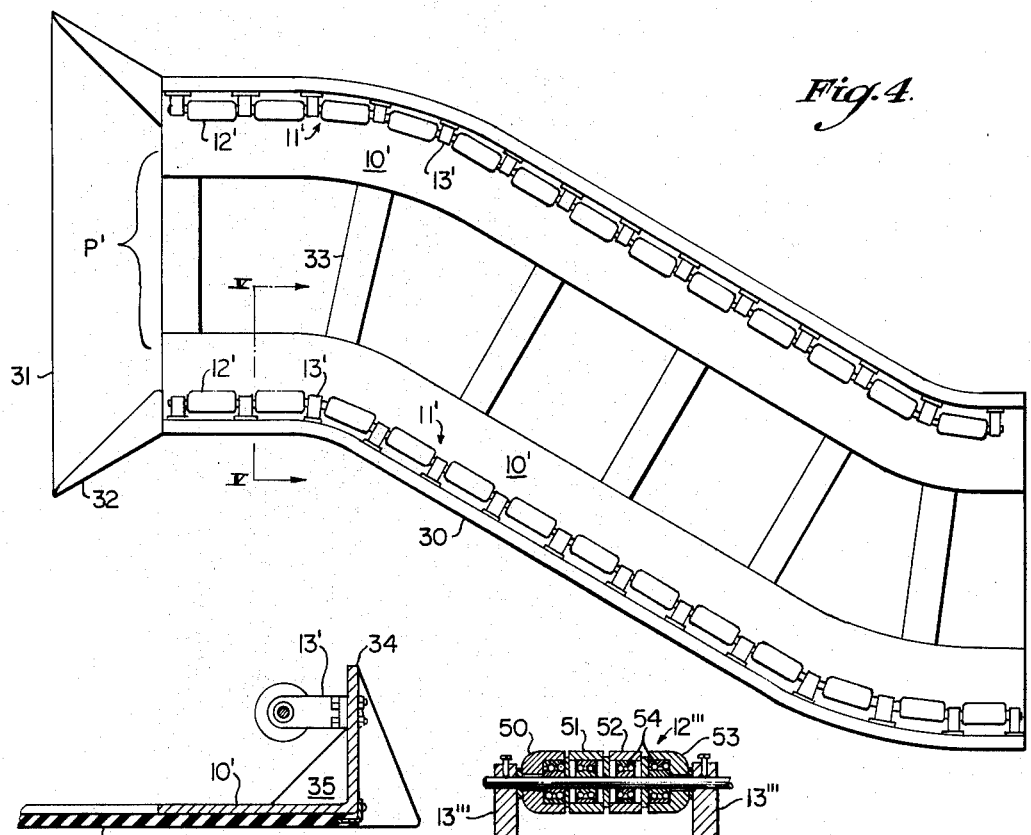
FIGURE 4 is a plan view of a portable wheel guide constructed in accordance with my invention.
Figures 5, 9:
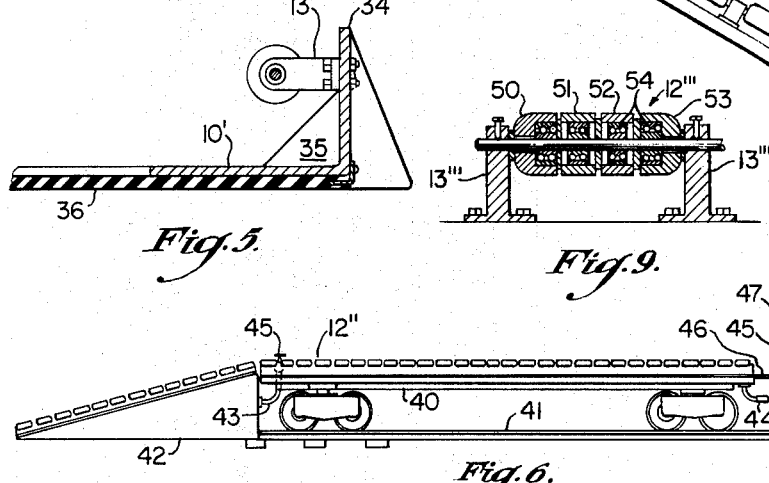
FIGURE 5 is an enlarged fragmental front view in cross-section, of the portable wheel guide taken along lines V—V of FIGURE 4.
FIGURE 9 is an enlarged fragmental cross-sectional view of a modified portion of my invention.

Referring now to FIGURES 4 and 5, there is shown a portable track or wheel guide device which can be carried by commercial trucks or stored at difficult loading locations. When its use is required, the guide can be placed upon the roadway and removed at other times so as not to obstruct normal use of the roadway. The basic concept of the portable device is the same as that described in connection with FIGURES 1 to 3 in that a predetermined pathway P' is defined by smooth plate means or surfaces 10' which in this case are part of an integral base sheet 30 made of steel or aluminum. Since the use of a water spray might be rather inconvenient, I prefer to decrease the co-efficient of friction in my portable device by employing highly polished surfaces on the plates 10' or by coating the surfaces with suitable friction reducing means. A pair of roller curbs 11 are positioned along the outer edges of the pathway defining plate means 10' and are composed of a plurality of axially-serially aligned rollers 12' supported for axial rotation by a plurality of interspersed support brackets 13'. Only two roller curbs 11' are employed in the portable device of FIGURE 4, since it is only necessary to engage two operatively opposed side walls of the vehicle tires to guide the vehicle in accordance with my invention and weight is important in this portable device.

The base sheet 30 of which the path-forming plates 10' are an integral part commences at one end in an integral or securely connected funnel-shaped entrance portion or apron 31 having sheet metal side walls 32 that assist in the initial locating of the vehicle with respect to the plate means 10'. To lessen the overall weight of the device, spaced portions of the sheet 30 are removed leaving a plurality of tie-like segments 33 which give rigidity to the device as a whole. The sheet member 30 is bent upwardly along its side, as best shown in FIGURE 5, to provide a supporting base wall or flange 34 for the brackets 13' such that the rollers 12' can be supported rigidly at a sufficient elevation to engage the proper portions of a commercial truck tire. The flanges 34 are reinforced adjacent each of the support brackets 13' by a welded fillet or web 35 of triangular shape. In order to maximize traction between the portable device and the cooperating roadway, a pad 36 of rubber or other friction increasing material is firmly attached to the lower surface of the sheet 30 as also shown in FIGURE 5.

When a truck wishes to back from a position in the traffic lane up to a loading dock adjacent a parking lane, the portable wheel guide device is laid on the roadway and the truck backs directly rearward, first engaging the apron portion 31 of the sheet member 30 to thereby place the weight of the truck on the wheel guide device and hold it in position. As the truck continues to back up, the wheel guide device will turn the trailer as necessary and position it adjacent the parking lane without damaging the expensive trailer tires.

Figure 6:
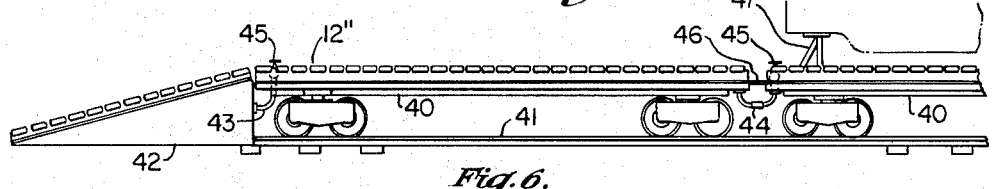
FIGURE 6 is a side elevational view of my invention as applied to a piggy-back railroad installation.
Figure 7:
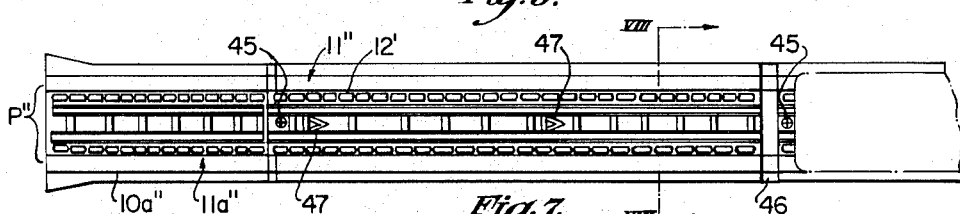
FIGURE 7 is a plan view of the embodiment of my invention shown in FIGURE 6.
Figure 8:
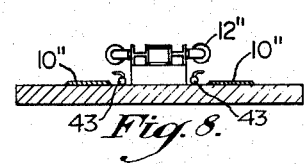
FIGURE 8 is a cross-sectional view taken along lines VIII—VIII of FIGURE 7.

FIGURES 6 through 8 show my invention as applied to a ferry-back or more commonly called "piggy-back" railroad situation. FIGURE 6 shows a pair of railroad flat cars 40 resting upon a suitable siding 41, for receiving trailers that are to be shipped cross-country. The structure and basic principles of operation of my rubber tired vehicle guide are similar to those of the apparatus shown in FIGURES 1 through 3; however, for economy's sake, and to avoid the presence of unnecessary obstacles, the outer roller curbs have been eliminated. The flat cars 40 are equipped with my rubber tired vehicle guide, which, in this embodiment, consists of a pair of steel plates or other smooth plate means 10″ that define a narrow pathway P″ along the railroad cars. Along inner edge portions of the plates 10″ are positioned a pair of outwardly-facing roller curbs 11″, each composed of a plurality of axially-serially aligned rollers 12″, as more clearly shown in FIGURES 7 and 8. For the sake of safety, I prefer to cover the entire roller support structure with a deck plate, not shown, along which a workman can walk.

The rollers 12″ of each curb 11″ engage opposed inner surfaces of the vehicle wheel to keep the vehicle moving in a straight line along the flat car. Adjacent one end of the siding 41 is an inclined ramp 42 which is also provided with a similar vehicle guide having plate means 10a″ and a pair of roller curbs 11a″ to guide the trailer therealong.

Suitable lubricant conduits 43 are provided in the central portion of the wheel guide apparatus to spray water upon the pathway forming plates 10″ as shown in FIGURES 7 and 8. The conduits 43 connect at the ramp to a source of water and are connected in series throughout the line of cars by suitable quick-disconnect means 44 similar to that provided on railroad air hoses. Each of the cars 40 has its own valving 45 so that when a car has been loaded the water supply thereto is cut-off, and continued only on those cars remaining to be loaded.

In operation a line of four or five flat cars will be backed up to a ramp awaiting loading. Between the cars is a small folding plate 46 that bridges the gap to pass the trailers along the entire length of aligned cars as is the usual practice in loading trailers of this type. Folding fifth-wheel anchor jacks 47 are supported in the central curb support assembly where each jack 47 remains flush until the trailer it is to support is in place. Trailers to be shipped will be waiting adjacent loading docks and they will individually be connected to a tractor which will back them up the ramp and along the entire row of flat cars to a final position the wheel guide will make misalignment of the trailer virtually impossible thus simplifying and greatly speeding the driver's task of loading the flat cars.

FIGURE 9 shows a modified form of roller 12‴ which is employed to guide very large diameter tires. The roller 12‴ is made up of several independently rotatable segments 50, 51, 52, and 53 which are all supported between a pair of stationary support members 13‴. Ball bearings 54 are employed to simplify lubricating and also to absorb axial thrust forces. By employing this form of roller, slippage between the roller and the tire can be minimized since the velocity gradient along the radius of the tire can be approximated by the composite sections of the roller.

From the foregoing it will be seen that I have devised an improved vehicle guide for assisting the operators of rubber-tired vehicles to maneuver along narrow pathways. It will also be appreciated that the specific applications chosen to illustrate the principles of my invention, represent effective solutions to some long-standing problems in vehicle maneuvering.

While some preferred embodiments of my invention have been shown herein, it is understood that various changes may be made in its construction by those skilled in the art without departing from the spirit of the invention as defined in the appended claims.

Having thus described my inventive concepts and some illustrative embodiments thereof, I claim:

1. In a railroad flat car for transporting trailers piggy-back fashion, track structure on the flat car for guiding rubber tires of the trailer along a pre-determined pathway which extends longitudinally of the flat car, the track structure comprising, in combination: a pair of widthwise spaced-apart smooth plates extending along the pathway on the flat car and providing a support surface for tires of the trailer, means on the flat car for sprinkling water upon said plates to reduce the coefficient of friction between said plates and the tires, means for substantially continuously engaging at least two opposed side walls of the tires to guide the tires along the pathway; said last-named means comprising, a first series of axially-serially aligned rollers and a second series of axially-serially aligned rollers, each of said rollers being of a length that is substantially less than the diameter of a guided tire, and means supporting each of said series of rollers along edge portions of said smooth plates in a position such that rollers of each of said series engage opposed side walls of trailer tires passing along the pathway.

2. Railroad flat car track structure as defined in claim 1 for guiding trailers having rubber tires along a pre-determined pathway, wherein each of said rollers is rounded in axial cross-section.

References Cited by the Examiner

UNITED STATES PATENTS

| | | | |
|---|---|---|---|
| 1,634,835 | 7/1927 | Lampert | 238—10 |
| 1,680,796 | 8/1928 | Lostetter | 134—123 |
| 1,969,845 | 8/1934 | Hick | 104—247 X |
| 2,168,624 | 8/1939 | Musgrave | 187—8.77 |
| 2,290,652 | 7/1942 | Russell | 214—38 |
| 2,577,890 | 12/1951 | Hardy | 238—14 |
| 2,892,656 | 6/1959 | Stuart | 94—31 |
| 2,927,513 | 3/1960 | Dove | 94—31 |
| 2,936,770 | 5/1960 | Emanuel | 134—123 |
| 3,042,309 | 7/1962 | Smith et al. | 238—4 |

FOREIGN PATENTS 1,173,473  10/1958  France.

MILTON BUCHLER, *Primary Examiner.*

LEO QUACKENBUSH, *Examiner.*